(12) United States Patent
Kabra et al.

(10) Patent No.: US 6,732,084 B1
(45) Date of Patent: *May 4, 2004

(54) METHOD AND APPARATUS FOR PARALLEL EXECUTION OF TRIGGER ACTIONS

(75) Inventors: Navin Kabra, Madison, WI (US); Jignesh M. Patel, Ann Arbor, MI (US); Jie-Bing Yu, Carlsbad, CA (US); Biswadeep Nag, Fremont, CA (US); Jian-Jun Chen, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/470,227

(22) Filed: Dec. 22, 1999

(51) Int. Cl.[7] ............................................. G06F 17/30
(52) U.S. Cl. ............................................. 707/2; 707/3
(58) Field of Search ............................... 707/1, 2–3, 4, 707/100, 104, 103 R; 717/109, 117; 395/601–603, 610–615, 682–704; 709/102, 226, 231; 710/33, 34; 714/35

(56) References Cited

U.S. PATENT DOCUMENTS

| | | | | |
|---|---|---|---|---|
| 5,548,770 A | * | 8/1996 | Bridges | 707/2 |
| 5,553,234 A | | 9/1996 | Cotner et al. | 714/16 |
| 5,682,535 A | * | 10/1997 | Knudsen | 717/117 |
| 5,754,841 A | * | 5/1998 | Carino, Jr. | 395/603 |
| 5,835,755 A | * | 11/1998 | Stellwagen, Jr. | 707/3 |
| 6,341,281 B1 | * | 1/2002 | MacNicol et al. | 707/3 |

OTHER PUBLICATIONS

Shi–Meng Huang et al: "The Activation of Active Rules in the Heterogeneous Database Systems"; ISBN 0–7803–3280–6 1996 IEEE.
Can Turker et al: "Towards Maintaining Integrity of Federated Databases"; ISBN 0–8186–8149–0 1997 IEEE.
Lyman Do et al.: "Active Database Management of global Data Integrity Constraints in Heterogenous Database Environments"; ISBN 0–8186–6910–1 1995 IEEE.
John Mylopoulos et al.: "A Generic Architecture for Cooperative Information Systems"; ISBN 0–8186–7505–5 1996 IEEE.

* cited by examiner

Primary Examiner—Safet Metjahic
Assistant Examiner—Te Y. Chen
(74) Attorney, Agent, or Firm—Gates & Cooper LLP

(57) ABSTRACT

A method and apparatus for parallel execution of trigger actions. One or more embodiments of the invention comprise providing a C++ class (hereinafter referred to as "dispatcher") that can take an SQL query or trigger action and start parallel execution of the trigger action. The trigger action is optimized and parallelized. The dispatcher executes the trigger action, sets up the communication links between the various operators in the trigger action, and ensures that all the results are sent back to the trigger.

21 Claims, 8 Drawing Sheets

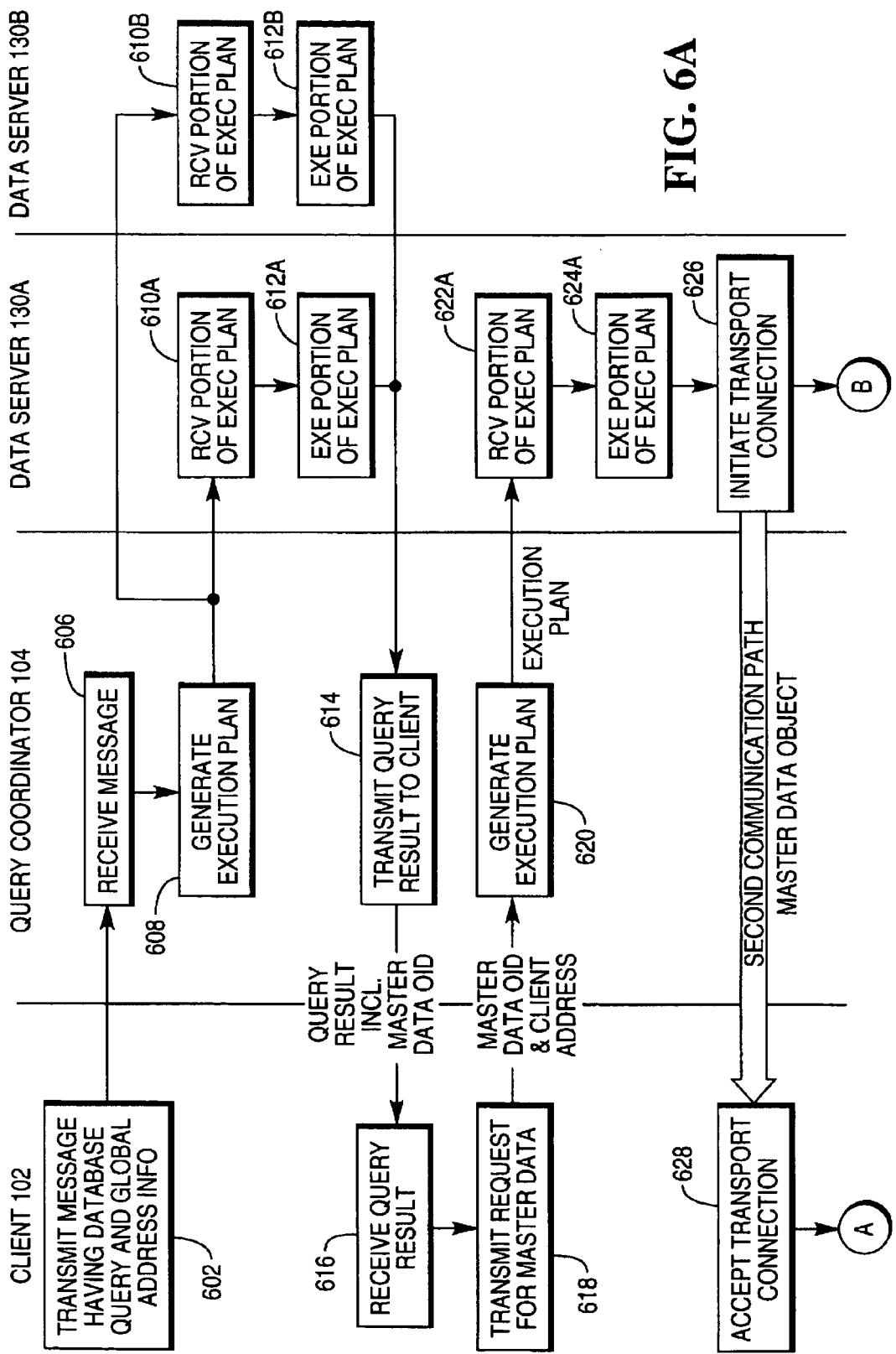

METHOD AND APPARATUS FOR PARALLEL EXECUTION OF TRIGGER ACTIONS

CROSS REFERENCE TO RELATED APPLICATIONS

Application Ser. No. 09/470,927, entitled "METHOD AND APPARATUS FOR PARALLEL EXECUTION OF SQL FROM STORED PROCEDURES" filed on Dec. 22, 1999, by Navin Kabara, Jignesh Patel, Jie-Bing Yu, Biswadeep Nag, and Jian-Jun Chen. Application Ser. No. 09/470,927 issued as U.S. Pat. No. 6,507,834 on Jan. 14, 2003.

BACKGROUND OF THE INVENTION

1. Field of the Invention

The present invention relates to systems and methods for performing queries on data stored in a database, and in particular to a method and system for executing SQL trigger actions in parallel.

2. Description of the Related Art

A trigger in a database provides that upon the occurrence of an event (such as an update of a record or tuple in a database), various actions are executed (referred to as trigger actions). Trigger actions can contain further modifications to a database. However, in a distributed and/or parallel database system, records and tuples may be spread out across various data servers and data storage units and the event or trigger may be fired from anywhere in the system. In such a situation, the prior art does not provide the ability to execute the trigger actions across the necessary data servers from anywhere in the system (e.g., where the triggering event (or tuple modification that caused the trigger to fire) is located). These problems may be better understood by describing databases and triggers.

Databases

The ability to manage massive amounts of information has become a virtual necessity in business today. The information and data are often stored in related files. A set of related files is referred to as a database. A database management system (DBMS) creates and manages one or more databases. Today, DBMSs can manage any form of data including text, images, sound and video. Further, large-scale integrated DBMSs provide an efficient, consistent, and secure means for storing and retrieving the vast amounts of data.

Certain computer languages have been developed and utilized to interact with and manipulate the data. For example, SQL (Structured Query Language) is a language used to interrogate and process data in a relational database (a database in which relationships are established between files and information stored in the database). Originally developed for mainframes, most database systems designed for client/sever environments support SQL. SQL commands can be used to interactively work with a database or can be embedded within a programming language to interface to a database. Thus, methods and functions may embed and utilize SQL commands.

To expedite the processing of information, databases may be parallelized such that data is distributed across multiple locations or data servers. When a query is executed, the query may be parallelized and run on each of the data servers. Such query parallelization provides for running the same query on multiple small portions of data in parallel rather than running the one query over one large portion of data sequentially.

Triggers

A trigger provides that whenever any tuple or record in a DBMS is updated, some condition is checked. If the condition is true, then a "trigger action" is executed. A trigger action can be any arbitrary SQL operation, stored procedure (see description below), user defined function (see description below), or any action desired. For example, in a Teradata® Object Relational (TOR) database (discussed in detail below), the trigger may use any of TOR's object relational features. Further, each trigger action in turn can cause its own triggers to fire. On a parallel or distributed DBMS the event (e.g., the update of a tuple) occurs on a particular data server (i.e., the data server where the tuple is located). Where the conditions are checked and where the trigger action is fired or invoked from may be anywhere in the system. However, the trigger action may need to execute a query on the entire database that is distributed across other data servers. The prior art does not provide a method for executing trigger actions across multiple data servers when the trigger is fired anywhere in a system. For example, when a trigger is fired from a particular data server, the prior art does not provide any method for executing the trigger action across all of the data servers.

Stored Procedures

Triggers may invoke the same set of commands/actions (or the same set of commands/actions with different parameters) at varying times and locations of a program. In such a situation, the set of commands/trigger actions may be placed into a stored procedure. A stored procedure is a batch of SQL statements stored in a database/on a server, that may be partially or fully processed/compiled before it is stored (or upon its first invocation). Additionally, a stored procedure is a method or procedure written in any programming language that is partially or fully processed/compiled before it is stored (or upon its first invocation).

Stored procedures may be called directly from a client or from a database trigger and are often stored on the server. A database trigger, as described above, is a user defined mechanism that causes a stored procedure to automatically initiate and execute upon the occurrence of the user specified events in the database (i.e., when the trigger "fires"). Thus, the trigger may not fire unless the event(s) specified by the user occurs. For example, a user may define a trigger to automatically fire whenever a user updates, deletes, or inserts data of a specific tuple.

Since stored procedures are typically stored on a data server, they are available to all clients and do not need to be replicated in each client. Further, by storing the stored procedure on the server, when the stored procedure is modified, all clients automatically get/have access to the new version. This saves programming effort especially when different client user interfaces and development systems are used. Further, this allows stored procedures to be an easy mechanism for sharing complex queries and functions between multiple applications. Additionally, SQL and stored procedures may call other stored procedures or cause other triggers to fire and may be written independently from (and without knowledge of) the underlying DBMS.

A stored procedure may be partially or completely processed/compiled before it is stored on the database. Consequently, the stored procedure does not have to be parsed and compiled each time it is invoked. Further, because a stored procedure is stored in a compiled format, it executes faster than if its constituent commands were executed individually.

Alternatively, a stored procedure may not be compiled prior to storage but may be automatically compiled the first time the procedure is invoked. As part of such a compilation, a query execution plan may be generated. The query execution plan describes the order in which tables are to be accessed and the indexes to be used. Further, the query execution plan is optimized for the stored procedure parameters and data in the database tables at the time the stored procedure is first executed.

A stored procedure may be invoked by its name. The caller can pass parameters to and receive results from the stored procedure. A user can create and name a stored procedure to execute specific database queries and perform other database tasks. For example, a user may create a stored procedure that returns the number of videos of a particular movie remaining in a video store for the video title that is specified at the time the stored procedure is called.

Stored procedures may also maintain the integrity of the database and prevent unauthorized users from modifying certain entries. For example, a user may be given the right to call a stored procedure that updates a table or set of tables but denied the right to update the tables directly.

Stored procedures may be created using a variety of mechanisms. The following format may be utilized to declare a stored procedure:

create proc {procedure name}
as
    {statement of block of statements}

For example the following stored procedure called myproc will return the number of Casablanca videos left in a video store as well as other movie titles, the rental price of those movie titles, and the location of those videos when Humphrey Bogart is an actor in the movie:

create proc myproc
as
begin
    select inv_videos
    from video
    where title_id="Casablanca"
    select title_id, rental_price, location
    from video
    where actor="Humphrey Bogart"
end As described above, stored procedures can also be passed parameters. Parameters may be defined as part of the stored procedure creation statement. The syntax of a "create proc" command with parameters is:

create proc {proc name}
    (@{param_name} {param_type},
        @{param_name} {param_type},
    )
as
    {statement}

For example, the following stored procedure may be passed the @mytitle and @myactor parameters for use in the select query:

create proc myproc
    (@mytitle char,
        @myactor char
    )
as
begin
    select inv_videos, title_id, rental_price, location
    from video
    where title_id=@mytitle
        or actor=@myactor
end Once a stored procedure has been created, a user can invoke the stored procedure using the following syntax:

exec [database.owner.]{procname} {opt params}

In the above syntax, "database" and "owner" will default to the current database and the current dbo (database owner). For example, the following command may invoke the stored procedure "myproc" defined above:

exec myproc "Casablanca", "Humphrey Bogart"

In this example, the user would see the same results as if the following command were utilized:

select inv_videos, title_id, rental_price, location
    from video
    where title_id="Casablanca"
        or actor="Humphrey Bogart"

Additionally, the "exec" portion of an invocation of a stored procedure is not necessary if the stored procedure call is the first line in a batch.

Stored procedures can also have a "return" status. A "return" statement returns from the stored procedure with an optional status parameter. The return status is zero for success, or negative otherwise. Negative values between –1 and –99 are reserved. For example, the following stored procedure returns a negative value (–999) if no rows/records are in the result set and a 0 if rows/records are in the result set:

create myproc (@mytitle char, @myactor char)
as
begin
    select title_id, rental_price, location
    from video
    where title_id=@mytitle
        or actor=@myactor
    if @@rowcount=0
        return –999
    else
        return 0
end The following commands illustrate the invocation of the above stored procedure with a return status:

declare @mystatus int
exec @mystatus=myproc "Casablanca", "Humphrey Bogart"
if @mystatus !=0
    begin
        {do error processing}
    end
else
    begin
        {do normal processing}
    end In addition to providing parameters when invoking a stored procedure, default values for the parameters may be specified:

create proc myproc
    (@myparam1 int=0,
        @myparam2 int=null,
        @myparam3 char(20)="mydefault"
    )
as . . .

The above stored procedure provides a default value of 0 for @myparam1, a default value of null for @myparam2, and a default value of "mydefault" for @myparam3. To invoke the stored procedure, the user may specify the values for one or more parameters, if desired, or may allow one or more of the default values to be utilized:

exec myproc 1/* params 2 & 3 default */

In the above invocation, only @myparam1 is specified in the execution line. Consequently, the specified default values for @myparam2 and @myparam3 are utilized (i.e., null and "mydefault").

Additionally, stored procedures can have output parameters as demonstrated below:

create proc myproc
      (@myparam1 int
        @myoutparam int output
      )
    as
      begin
        select @myoutparam=count(*)
        from titles
        where x>@myparam1
      end The output for the above stored procedure is the number of rows (i.e., the count) in the titles table where the value of x is greater than @myparam1.

Thus, since stored procedures may modify or access tuples in a database, a stored procedure may cause a trigger to fire and result in the execution of additional trigger actions.

User Defined Functions

In view of the vast amounts of data and types of data that have become popular, wider varieties of methods and functions for manipulating and working with the data have become a necessity. Such functions and methods are often written independently from (and without knowledge of) the underlying DBMS. Further, users often write such functions and methods (referred to as user defined functions (UDFs)). Such functions and methods often contain embedded SQL commands. Further, a UDF may be invoked as part of a trigger action.

Users can specify and attach arbitrary UDFs to existing datatypes in data servers. Consequently, when the datatype or data changes, a trigger may invoke the UDF. Typically, UDFs are utilized or invoked within a RDBMS (Relational Database Management System). Further, UDFs may operate on ADTs and can be written in any programming language including C ++. For example, a user can define an ADT for fingerprint images, and a UDF that analyzes fingerprint images. As part of an UPDATE query (an SQL command that provides the ability to modify data stored in a database), a UDF can extract and store in the database an alphanumeric feature vector representing each fingerprint in the database. Subsequent SELECT queries (queries to select certain records that meet certain specified conditions) can use these feature vectors to qualify rows for retrieval. Such UDFs are called "Update" UDFs. For example, the following UPDATE query illustrates the use of an Update UDF:

UPDATE FINGERPRINT_TBL
      SET ADT_FNGR_PRNT_IMG=UDF_EXTRCT_VCTR

The above command updates the fingerprint table (FNGERPRINT_TBL) by setting (SET) each entry in the column containing abstract data types for fingerprint images (ADT_FNGR_PRNT_IMG) equal to the value provided in a UDF (UDF_EXTRCT_VCTR). In addition, a UDF can be passed parameters (ADT or standard data types) to utilize in its operations.

Alternatively, a UDF can be used directly in a SELECT query predicate to extract features from images and qualify rows for retrieval. The predicate of a SELECT query specifies the conditions or criteria for the records or information to be retrieved. Thus, the UDF is utilized as an operator to determine the information to be retrieved. For example, suppose the following SELECT query is utilized:

SELECT NAME, CITY, STATE, ZIPCODE
    FROM CUSTOMER
      WHERE UDF_BUYINGPOWER (NAME)=
        EXCELLENT

The type of SQL command—SELECT—is specified followed by the information to be retrieved (e.g., NAME, CITY, STATE, and ZIPCODE) from the CUSTOMER table. The predicate is specified by the WHERE statement. Thus, in the above SQL query, the SELECT query predicate provides that only records wherein a buying power of a particular person is excellent will be retrieved. A UDF, UDF_BUYINGPOWER is utilized in the predicate as an operator to filter records or determine which information is to be retrieved. UDFs can also utilize ADTs. For example, instead of using the NAME parameter, an ADT may be utilized. When a UDF is utilized in the predicate, the UDF is called a "Predicate" UDF. In either case (i.e., Update or Predicate UDFs), the user is retrieving rows based on an object's semantic content called "query-by-content".

There is a third type of UDF called a "Projection" UDF. A projection is a basic query operation that provides a subset (in a list) of the columns in a table. A projection UDF typically operates on objects in the projection list of a query. For example, if an image was stored in data storage device 132 in Tagged Image File Format (TIFF) but had to be delivered to the client in Joint Photographics Experts Group OPEG) format, this could be accomplished by executing a UDF that performed the TIFF to JPEG conversion on the images obtained in a query projection list before transferring it back to the client. The following SQL illustrates a Projection UDF:

SELECT UDF_TIFF_TO_JPEG(ADT_IMGS_TIFF)
      FROM IMG_TBL

The above SELECT command selects the ADT_IMGS_TIFF column from the table (IMG_TBL). However, the SELECT command utilizes the UDF called UDF_TIFF_TO_JPEG to transform the ADT_IMGS_TIFF column into JPEG format. In the above example, the UDF is passed a parameter consisting of a column (e.g., the ADT_IMGS_TIFF column).

UDFs can be supplied from many sources. As the name infers, the database users can write UDFs. This is important because they are often quite application specific. UDFs can be supplied by the DBMS owner such as NCR Corporation, the assignee of the present invention. For example, UDFs can be utilized for text search and retrieval and for image manipulation. Alternatively, UDFs can also be supplied by third-party vendors who would like their object data types and processing algorithms to be incorporated into a DBMS.

SUMMARY OF THE INVENTION

To address the requirements described above, the present invention discloses a method, apparatus, and an article of manufacture for parallel execution of trigger actions.

One or more embodiments of the invention comprise providing a C++ class (hereinafter referred to as "dispatcher") that can take an SQL query or trigger action and start parallel execution of the trigger action. The trigger action is optimized and parallelized. The dispatcher executes the trigger action (or query of a trigger action), sets up the communication links between the various operators in the trigger action, and ensures that all the results are sent back to the trigger.

BRIEF DESCRIPTION OF THE DRAWINGS

Referring now to the drawings in which like reference numbers represent corresponding parts throughout:

FIGS. 6A and 6B are diagrams illustrating one or more embodiments of the invention;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

In one or more embodiments of the invention, a relational database or an object relational database (e.g., a Teradata® Object Relational (TOR) database) may be utilized. In an object relational database, tables of information may contain both coded (alphanumeric) data and multimedia object data. These tables are referred to as object-relational tables. Coded data is contained in table columns defined with traditional relational database data types, such as integer, character, floating point, and date. Objects are contained in table columns defined with Abstract Data Types (ADT) such as text, images, audio, and video. The objects persist in the table such that they may be retrieved and used instead of creating a new instance of an object. Further SQL commands may be utilized to interact with and manipulate the records/information in the tables. Alternatively, data in an object relational database may be wrapped or encapsulated by an object that provides an interface to edit, delete, manipulate, etc. the data.

Figure 1:
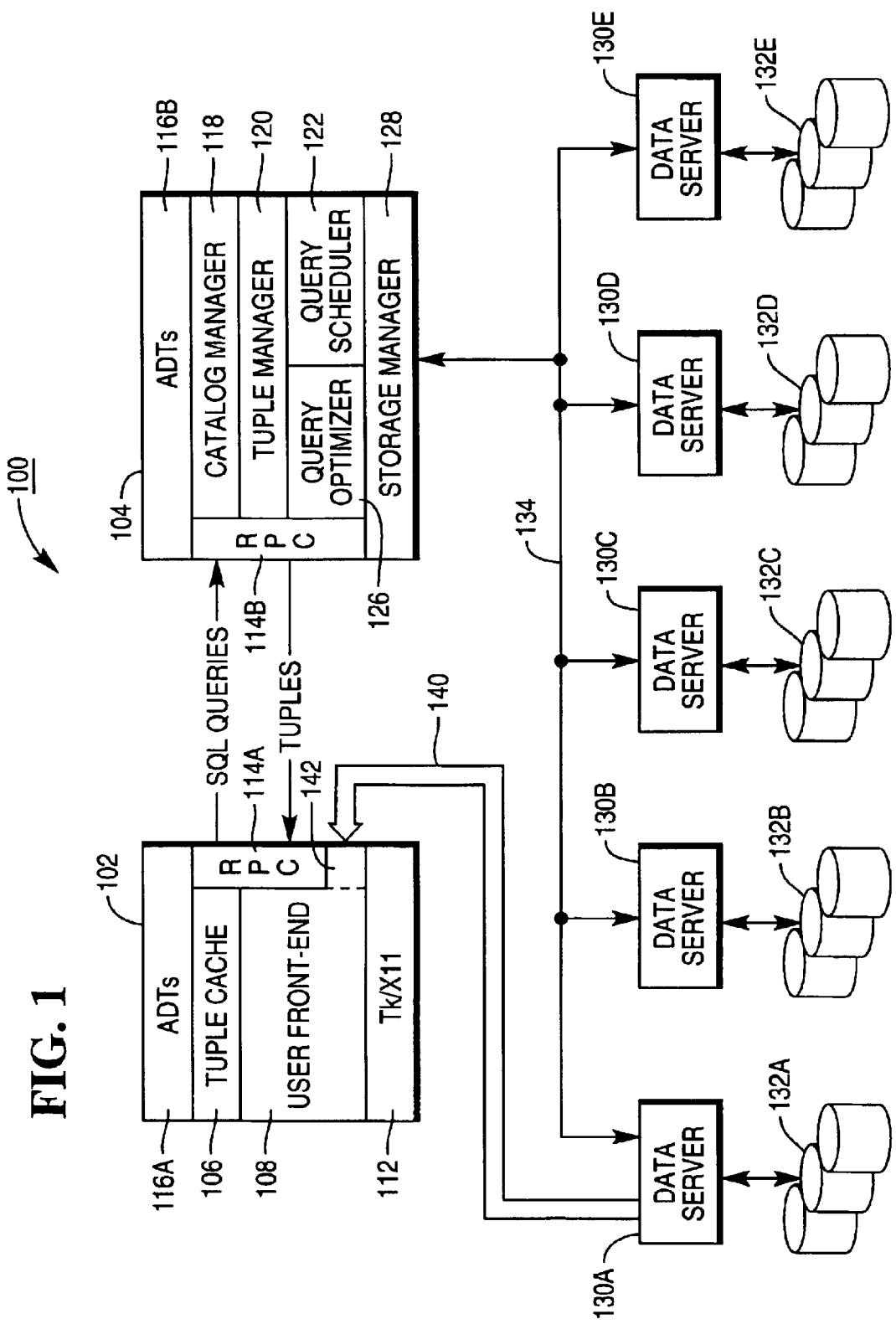
FIG. 1 is a block diagram showing an exemplary environment for practicing one or more embodiments of the present invention.

FIG. 1 is a diagram showing an exemplary environment in which one or more embodiments of the invention provide for parallel execution of SQL commands. However, the underlying details of FIG. 1 are modified to provide for parallel execution of trigger actions invoked from anywhere in the system. The database system 100 uses a client-server architecture comprising a query scheduler 122 implemented in a query coordinator (QC) 104 and one or more data servers (DS) 130A–130E (hereinafter referred to as data server(s) 130) storing data in one or more data storage devices 132A–132E (hereinafter referred to as data storage device(s) 132. The data servers 130 also perform portions of the execution plan in execution threads as determined by the query coordinator 104 to execute the query. The query coordinator 104 and data servers 130 may be implemented in separate machines, or may be implemented as separate or related processes in a single machine. The QC 104 and the DS 130 communicate via a communication infrastructure 134 which can automatically select the most efficient mechanism for the transport of data between the QC 104 and any one of the DS 130 elements. When a message is between processes or entities that do not share a common memory system, a transport protocol such as transmission control protocol (TCP) or message passing interface (MPI) can be utilized to transfer the information. However, when the communication is between processors on a symmetric multiprocessing system (SMP), memory may be used as the transport vehicle.

Client processes 102, which can include applications or graphical user interfaces (GUIs), can connect to the QC 104 for submitting a query. After parsing and optimization, the QC 104 generates an execution plan (referred to as an ASCII plan) for the query, performs further processing on the ASCII plan (discussed below), and transmits portions of that plan to the appropriate data servers 130A–130E for execution. Hence, the QC 104 controls the parallel execution of the query on the DS 130 processes. Query results including result sets are collected by the QC 104 for delivery back to the client process 102.

The QC 104 and DS 130 processes can be implemented as multithreaded processes on top of a storage manager 128. The storage manager 128 provides storage volumes, files of untyped objects, B+ trees and R* trees. Objects can be arbitrarily large, up to the size of the storage volume. In one embodiment, allocation of storage space within a storage volume is performed in terms of fixed size extents. The associated I/O processes and the main storage manager 128 server process share the storage manager 128 buffer pool, which is kept in shared memory.

The database system 100 uses many basic parallelism mechanisms. Tables may be fully partitioned across all disks in the system 100 using round robin, hash, or spatial declustering. When a scan or selection query is executed, a separate thread is started for each fragment of each table.

In one embodiment, the database system 100 also uses a push model of parallelism to implement partitioned execution in which tuples are pushed from leaves of the operator tree upward. Every database system 100 operator (e.g. join, sort, select, . . . ) takes its input from an input stream and places its result tuples on an output stream. The streams themselves are C++ objects and can be specialized in the form of "file streams" and "network streams". File streams are used to read/write tuples from/to disk. Network streams are used to move data between operators either through shared-memory or across a communications network via a transport protocol (e.g. TCP/IP or MPI). In addition to providing transparent communication between operators on the same or different processors, network streams also provide a flow-control mechanism that is used to regulate the execution rates of the different operators in the pipeline. Network streams can be further specialized into split streams, which are used to demultiplex an output stream into multiple output streams based on a function being applied to each tuple. Split streams are one of the key mechanisms used to parallelize queries. Since all types of streams are derived from a base stream class, their interfaces are identical and the implementation of each operator can be totally isolated from the type of stream it reads or writes. At runtime, the scheduler thread (running in the QC process 104 through Query Scheduler 122), which is used to control the parallel execution of the query, instantiates the correct type of stream objects to connect the operators.

For the most part, the database system uses standard algorithms for each of the basic relational operators. Indexed selections are provided for both non-spatial and spatial selections. For join operations, the query optimizer 126 can choose from nested loops, indexed nested loops, and dynamic memory hybrid hash joins. The database system's query optimizer 126 considers replicating small outer tables when an index exists on the join column of the inner table.

The database system uses a two-phase approach for the parallel execution of aggregate operations. For example, consider a query involving an average operator with a group by clause. During the first phase each participating thread processes its fragment of the input table producing a running sum and count for each group. During the second phase a single processor (typically) combines the results from the first phase to produce an average value for each group.

Since standard SQL has a well defined set of aggregate operators, for each operator the functions that must be performed during the first and second phases are known when the system is being built and, hence, can be hard coded into the system. However, in the case of an object-relational system that supports type extensibility, the set of aggregate operators is not known in advance as each new type added to the system may introduce new operators. Hence, a mechanism is provided for specifying the first and second phase functions with the definition of each aggregate.

The query coordinator 104 also comprises a tuple manager 120, a catalog manager 118, a query optimizer 126, a query scheduler 122, and a storage manager 128. The tuple manager 120 receives the tuples from the data servers 130, formats and processes the tuples, and passes them along to the client program 102. The catalog manager 118 manages metadata regarding the tables and types in the database. The query optimizer generates an execution plan (referred to as an ASCII plan) for queries received from the client process 102.

Figure 2:
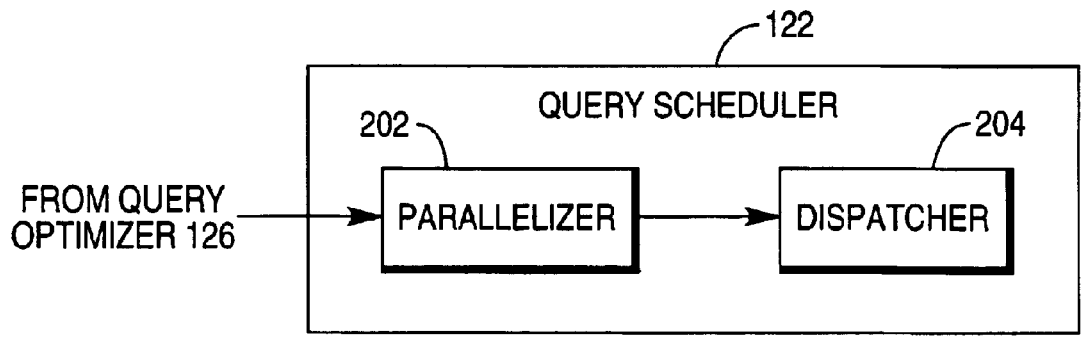
FIG. 2 is a diagram illustrating the details of the query scheduler in accordance with one or more embodiments of the invention.

Thus, in accordance with one or more embodiments of the invention, when a query comes into the system, the query is sent to query optimizer 126 where the query is parsed/typechecked, optimized, and generated into an ASCII plan (a sequential execution plan). The ASCII plan is then forwarded to query scheduler 122. As illustrated in FIG. 2 query scheduler 122 contains a parallelizer 202 and a dispatcher 204. When the ASCII plan is forwarded from query optimizer 126 to query scheduler 122, parallelizer 202 receives the ASCII plan and generates a parallel execution plan. The parallel execution plan is then sent to dispatcher 204. Dispatcher 204 performs the execution of the parallel plan.

Figure 3:
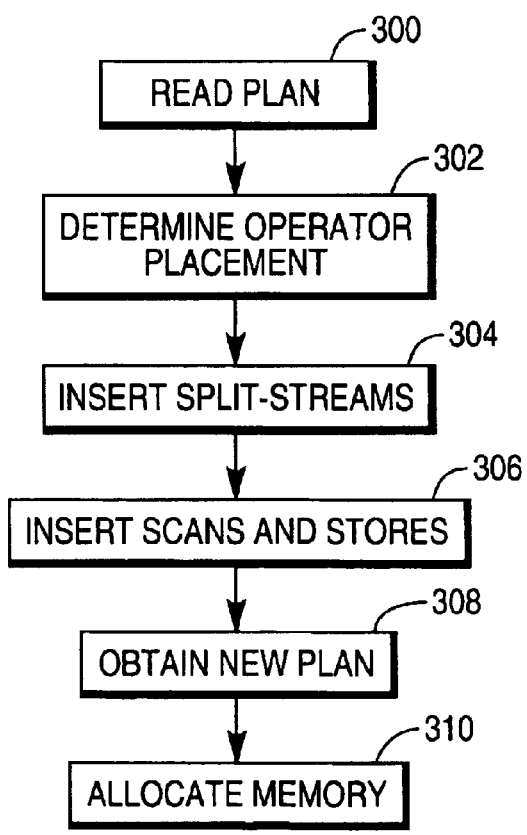
FIG. 3 is a flow chart illustrating the operation of a parallelizer in accordance with one or more embodiments of the invention.

FIG. 3 is a flow chart illustrating the operation of parallelizer 202. At step 300, the ASCII plan is read/received from query optimizer 126. Once read, a new plan is developed. At step 302, parallelizer 202 determines the placement of the various operations on the various nodes (i.e., appropriate data server 130) in the system. At step 304, split-streams are inserted into the new plan at the appropriate locations. Split-streams provide the ability to perform the necessary declustering and partitioning of data servers 130 and data storage devices 132. At step 306, any scans and stores that are necessary are inserted into the plan.

At step 308, the completed new plan is obtained. In one or more embodiments of the invention, the ASCII plan is broken down and an "exec_plan_t" is obtained. An exec_plan_t is essentially a break-up of the ASCII plan into a list of segments. In accordance with steps 304 and 306, the split-streams, scans, and stores are inserted into the exec_plan_t. The new plan can be executed by sequentially executing each segment one after another. Each segment is a list of operators that can be executed concurrently in a pipelined fashion. Thus, since each segment can be executed concurrently by different data servers 130, the parallelism of database system 100 is established. At step 310, memory needed for the individual operators of each segment are allocated. In one or more embodiments of the invention, the MemoryManager is utilized for memory allocation. However, it should be noted that any memory management technique/program may be utilized in accordance with embodiments of the invention.

Figure 4:
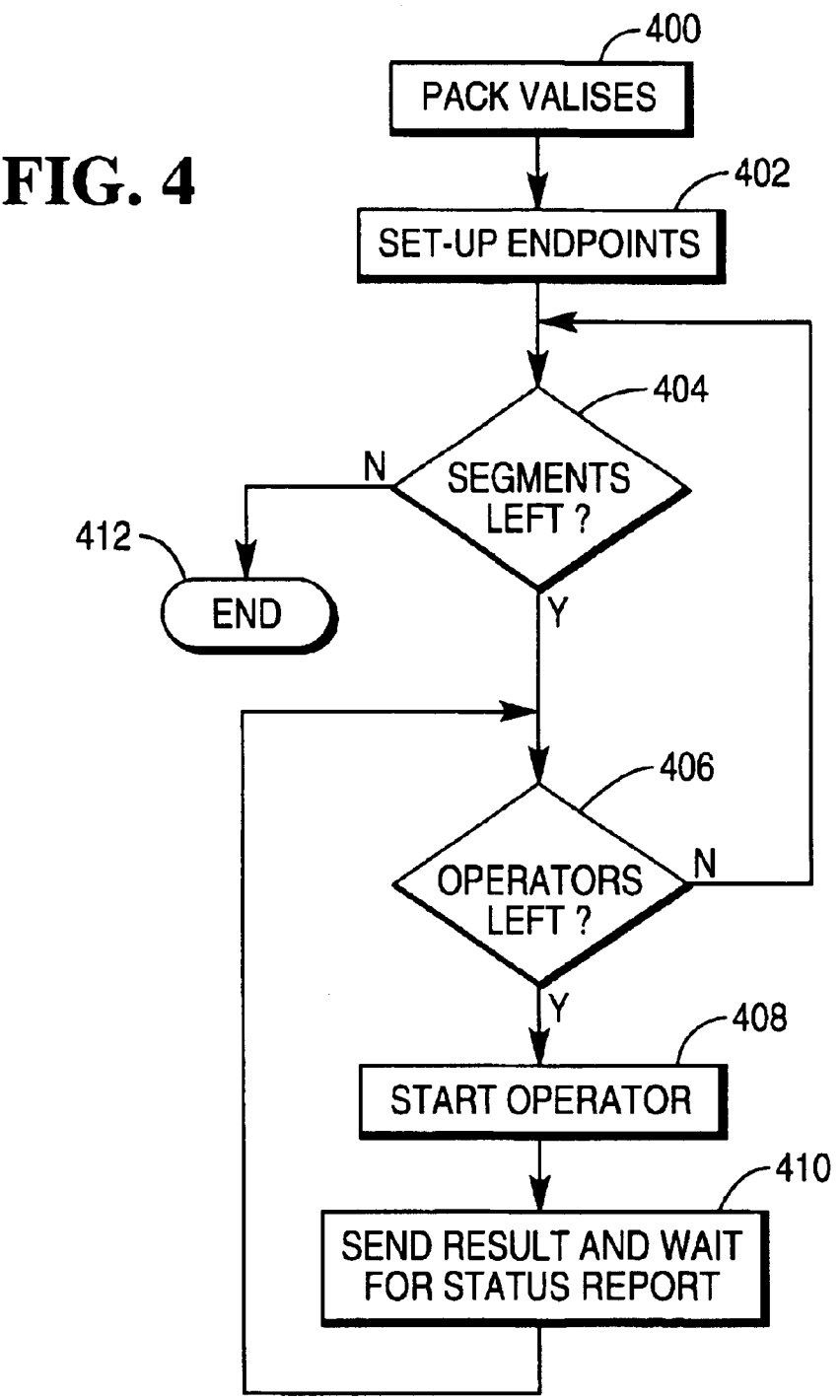
FIG. 4 is a flow chart illustrating the operation of a dispatcher in accordance with one or more embodiments of the invention.

FIG. 4 is a flow chart illustrating the operation of dispatcher 204. Dispatcher 204 is responsible for dispatching and executing an exec_plan_t by starting segments on appropriate data servers 130. At step 400, dispatcher 204 packs operator information and arguments into valises. A valise is a flat representation of scheduler data structures that can be transmitted over a network from one node to another node. Nodes may be viewed as units, systems, or any other structure in database system 100. For example, QC 104, client program 102, data servers 130, and data storage devices 132 are all nodes. Further, in one or more embodiments of the invention, resources may not be shared between nodes. For example, node client program 102 may contain memory, a processor, etc. and node query coordinator 104 may also contain memory, a processor, etc. wherein neither client program 102 nor query coordinator 104 shares their resources (memory, processor, etc.). When resources are not shared between nodes/systems, it is referred to as a shared nothing architecture.

At step 402, dispatcher 204 sets up various endpoints so that each operator in the pipeline knows where to send its results. At step 404, a determination is made regarding whether any more segments are left that have not been executed. If not, the process is complete at step 412. If segments are left, a determination is made as to whether the segment contains any operators that have not been executed. If there are no operators left in the current segment, processing continues at step 404.

However, if operators are left, the operator is started at step 408. At step 410, the results for the operator are transmitted to the endpoint set-up in step 402 and dispatcher 204 waits for the status reports from the operator. Processing then continues at step 406.

In one or more embodiments of the invention, the plan (e.g., exec_plan_t) is set up in such a manner, that the top-most operator in the query writes its output to a query tree. A query tree is a hierarchical structure that provides the ability to order the results/output from a query. After the query outputs the results to the query tree, the query tree stores the results in a temporary file on a disk.

Thus, in accordance with one or more embodiments of the invention, dispatcher 204 starts up all operators in a segment, transmits the results, and waits for the status reports from each operator started. Additionally, after all of the operators in a segment have completed execution, dispatcher 204 repeats the process for all of the other segments in the exec_plan_t.

Referring back to FIG. 1, client program 102 comprises a front end 108, which provides a graphical user interface that supports querying, browsing, and updating of database objects through either its graphical or textual user interfaces. In either case, the front end transforms a query into an extended SQL syntax and transmits it to the data server 130 for execution. After executing the query, the query coordinator 104 transmits the results back to the client program 102 in the form of a set of tuples that can be iterated over using a cursor mechanism. In one embodiment, all communications between the front end 108 and the processes implemented in the query coordinator 104 are in the form of remote procedure calls 114A and 114B implemented over a Transmission Control Protocol/Internet Protocol (TCP/IP). The client process 102 also comprises a tuple cache 106 for retaining tuples received from the query coordinator 104. Abstract Data Types (ADTs) 116A and 116B can be stored and/or processed in either the query coordinator 104 or the client process 102.

The client front end 108 permits the display of objects with spatial attributes on a 2-D map. For objects with multiple spatial attributes, one of the spatial attributes can be used to specify the position of the object on the screen. The spatial ADTs currently supported include points, closed polygons, polylines, and raster images.

The client front end 108 can also present a layered display of overlapping spatial attributes from different queries or tables. For example, one can display city objects that satisfy a certain predicate (e.g. population >300K) in one layer on top of a second layer of country objects.

The client front end 108 also allows the user to query through a graphical interface; implicitly issuing spatial queries by zooming, clicking, or sketching a rubber-banded box on the 2-D map. The graphical capabilities of the client can be implemented using toolkits such as Tk/X11. Further, the user can query by explicitly composing ad-hoc queries in the database system's 100 extended SQL syntax.

The user can use the client front end 108 to browse the objects from a table. In this mode, attributes are displayed as ASCII strings. The front end 108 can also be used to update database objects. Object(s) to be updated can be selected either by pointing-and-clicking on the 2-D map or by selecting via the textual browser.

Finally, the client front end 108 can also be used to perform general catalog operations including browsing, creating new databases, defining new tables, creating indices on attributes, and bulk loading data into tables from external files.

The database system 100 also advantageously uses a second communication path 140 to transmit selected data such as master object data and large objects to the client 102, as described further below. The direct data transfer module 142 in the client 102 receives this data.

Figure 5:
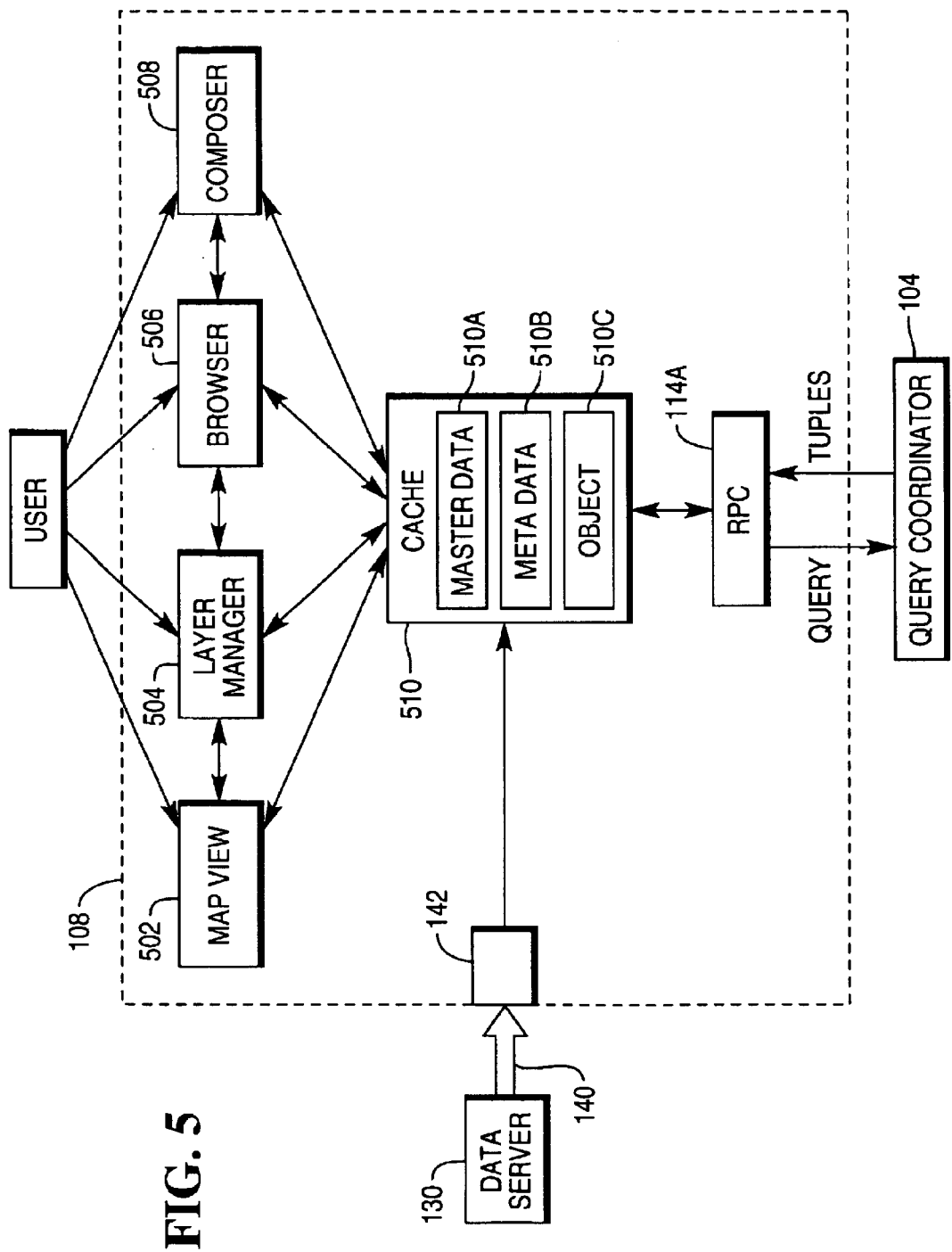
FIG. 5 is a diagram showing one or more embodiments of the user front end of the exemplary hardware environment depicted in FIG. 1.

FIG. 5 is a diagram showing one embodiment of the user front end of the exemplary environment depicted in FIG. 1. The client front end 108 comprises a map view 502, layer manager 504, browser 506 and a query composer 508. The map view 502 is responsible for displaying and manipulating objects contained in one or more layers. The current position of the cursor is continuously displayed in a sub-window in units of the map projection system. Users can point and click on displayed objects to view their non-spatial attributes. The layer manager 504 is responsible for adding, deleting, hiding, and reordering layers displayed by the map view 502. Each layer corresponds to a table of objects produced by executing some query. The extent browser 506 allows a user to view any database table and adjust the way it should be displayed by the map view 502. The selected table becomes a new layer with its spatial attributes displayable via the map view 502.

The query composer 508 allows a user to compose a SQL query using a simple text editor. The RPC 114A is the interface to the query coordinator 104. It ships SQL queries to the query coordinator 104 for execution and retrieves result tuples into the cache 510. The cache 510 comprises a master data cache 510A, a metadata cache 510B and an object cache 510C. The object cache 510C caches the result of a query in formats understood by the map view 502. The metadata cache 510B stores the catalog information of the currently open database. The master data cache 510A stores retrieved master data as described further below. In one embodiment, the object cache 510C also caches the objects downloaded from the data servers 130. FIG. 5 also shows the second communication path 140 from the data server 130 to the user front end 108 via the direct data transfer module 142.

Array-based abstract data types (ADTs) can be used as basis for a number of useful data types, including BLOBs, CLOBs, video, audio, text, image, maps and other large objects. Array-based ADTs use an external out-of-line storage for very large objects.

FIG. 6A is a diagram illustrating one or more embodiments of the present invention. The client 102 transmits 602 a message to the query coordinator 104. The message includes a database query, and may optionally include client address information. The query coordinator 104 receives 606 the message and using the information in the message, generates 608 an execution plan (i.e., query optimizer 126 generates the ASCII plan). The execution plan is then parsed into one or more portions, each of which represents an execution plan thread (an exec_plan_t) (i.e., the query scheduler 122 using parallelizer 202 and dispatcher 204 parallelize and provide for execution of the plan). These are transmitted to the data servers 130, which receive 610 and execute 612 their respective portions of the execution plan. Results from the data servers 130 are transmitted to the query coordinator 104, which compiles the results into a query result having a result set. This information is transmitted 614 back to the client 102. In one embodiment, this query result information includes an object identification (OID) for the master data (MOID). Other query result information may also be included, such as the dimensions and size of the master data.

It is important to note that master data associated with the MOID (that which is responsive to the database query) can be quite large. Hence, while the master data could be delivered via the query coordinator 104 to the client 102, direct transfer from the data server in such cases best accomplishes such delivery.

Returning to FIG. 6A, the client transmits 618 a request for the master data. Included in this request is the OID for the master data (the MOID). In one embodiment, this client address information is globally unique and includes the client address and port.

The query coordinator 104 accepts this message, and from the information in the message, generates 620 another execution plan. This execution plan (which includes the client global address) is simpler than the one generated previously (to respond to the database query), but nonetheless, still requires the generation of a fetch object operator. Alternatively, the MOID can be transmitted from the client 102 to the data server 130 without intervention of the query coordinator 104, or the query coordinator 104 can simply accept the request for the master data and pass it along to the data server 130.

The data server 130 receives 622 and executes 624 the applicable portion of the execution plan, and initiates 626 a transport connection with the client 102 via the second communication path 140 using the client IP address and port number. The client 102 accepts 628 the transport connection.

Figure 6B:
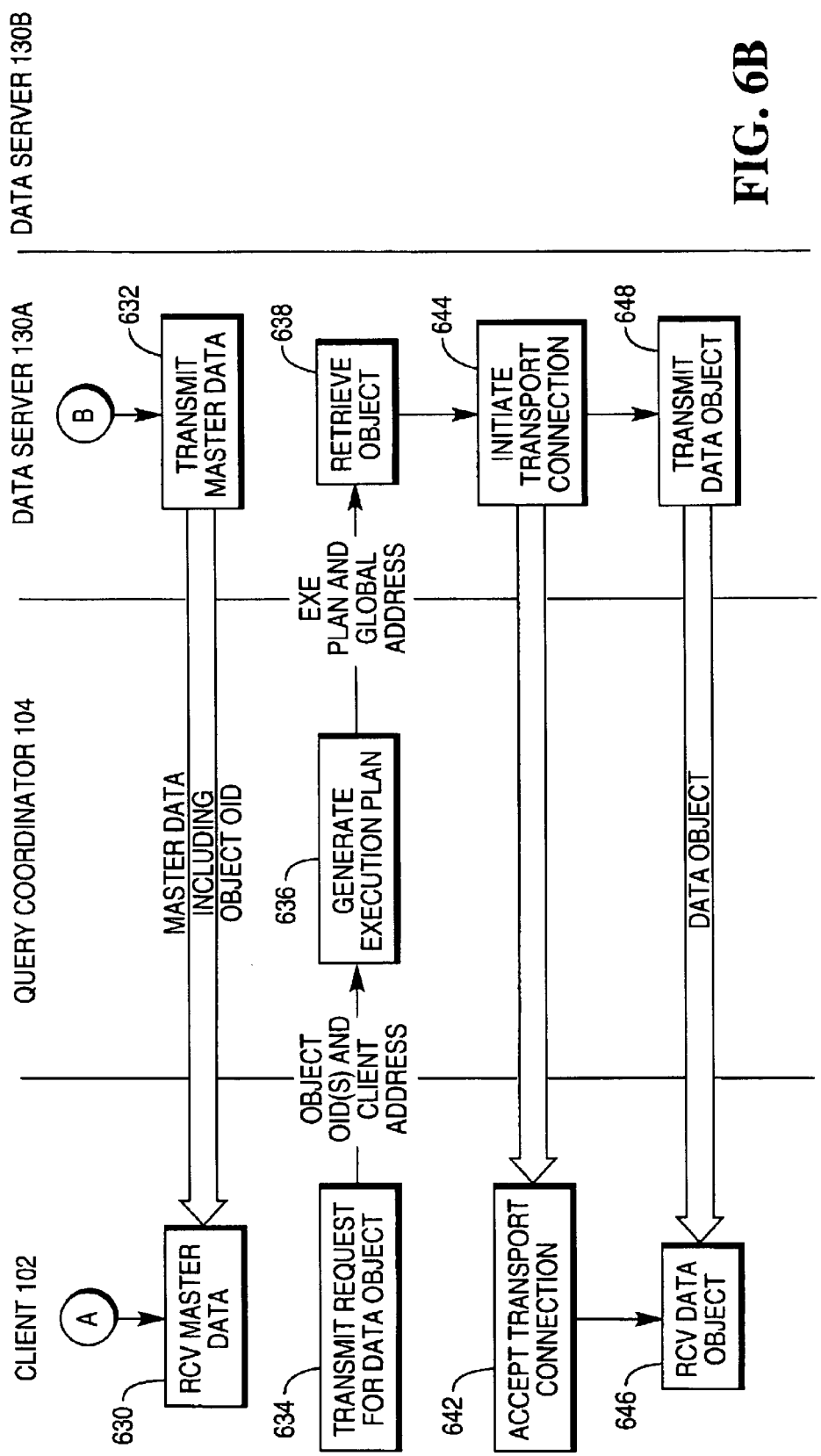

FIG. 6B shows the client data server transmitting 632 the master data via the transport connection on the second communication path 140 to the client 102. In one embodiment, the master data includes information such as the dimensions and size of the related master object, and an object identification (AOID) for the data objects associated with the master data object.

The user may then request one or more data objects in the array that cumulatively represents the master data object. This data is represented in one of the data objects, having related object identifications (AOIDs) that were transmitted with the master data object. That request can be submitted by transmitting a message including the AOIDs of the data objects of interest and the address of the client 102 to the query coordinator 104. The query coordinator 104 again generates 636 a simple execution plan designed to retrieve the data objects of interest from the data server 130. The execution plan and the address of the client 102 are sent to the data server 130, which retrieves 638 the objects from the storage manager. In one embodiment, the data server uses the client address to initiate 644 a transport connection with the client 102. The client 102 accepts 642 the transport connection. In another embodiment of the present invention, the transport connection originally established with the client 102 (in block 626) is maintained for the duration of the session with the client 102. In this embodiment, there is no need to re-establish the transport connection between the data server 130 and the client 102. In any case, the data server 130 transmits 648 the requested data object, and the client 102 receives it through the second communication path 140.

Using the foregoing technique, all of the AOIDs for the master data are collected across all of the tuples in the current query result set, and are fetched all in one batch. Similarly, the array data objects can be fetched in batch mode. The same approach can be applied to the real objects themselves.

Triggers

One or more embodiments of the invention allow users to specify arbitrary triggers that can use the complex types of TOR, the functions and methods, as well as the UDFs and stored procedures. As described above, triggers are typically utilized or invoked within the RDBMS (Relational Database Management System). However, triggers may be invoked anywhere in a system. For example, even though a tuple is updated on a data server 130, the condition may be checked on query coordinator 104 or client program 102. Consequently, the trigger may be fired from query coordinator 104 or client program 102. In a distributed or TOR system (or a system using a shared nothing architecture), trigger actions that contain queries to be performed must be started in parallel on a number of data servers 130 in the system 100. Further, each trigger action can cause its own triggers to fire. This requires the ability to start up a parallel execution of an arbitrary query or trigger action from anywhere in system 100.

One or more embodiments of the invention provide for executing trigger actions by providing a class called dispatcher that can take a SQL query and start parallel execution of the query. The dispatcher parallelizes the query, executes it, sets up the communication links between the various operators in the query, and ensures that all of the results are sent back to the data server 130 that originated the query request (e.g., the data server 130 where the trigger was fired from).

Parallel execution of SQL relies on the fact that a query is executed on the various data servers 130 in the parallel system 100. Similarly, parallel execution of trigger actions (that are likely comprised of SQL) relies on the fact that the trigger actions are executed on the various data servers 130 in the parallel system 100.

As described above, triggers may be fired from anywhere in system 100. In one or more embodiments, triggers are fired from individual data servers 130 in response to an event occurring on one of the data servers 130 (e.g., an update or modification to a tuple). Further, trigger actions may include additional queries to be executed on data distributed across data servers 130. Thus, it is problematic to obtain and execute queries/trigger actions on multiple data servers 130 when the trigger is fired from a particular data server 130.

Further, using the embodiments described above, when executing SQL commands/queries, the system catalogs, as described above, are needed. System catalogs are only available to query coordinator 104 through catalog manager 118 and are not accessible from data servers 130. Thus, in the above embodiments, execution of a SQL query of a trigger action at a data server 130 can be a problem.

To invoke trigger actions from anywhere in system 100 and execute trigger actions on data servers 130, one or more embodiments of the invention conduct preprocessing on the trigger action. In such embodiments, the preprocessing breaks up the execution of the trigger action into two parts: (1) a part that requires access to system catalogs, and (2) a part that does not require access to system catalogs. Subsequently, it is ensured that the first part is executed at QC 104 before the trigger action starts execution. The second part, which does not require access to the system catalogs, can then be safely executed at the local nodes (i.e., data servers 130).

As described above, certain operations may only be performed at certain nodes (e.g., catalog accesses may only be performed by QC 104). To enable the paralellization of the execution of the trigger action (or a query of the trigger action), one or more embodiments of the invention parallelize and divide the operations needed to execute the trigger action and distribute the operations to either QC 104 or data server 130.

Figure 7:
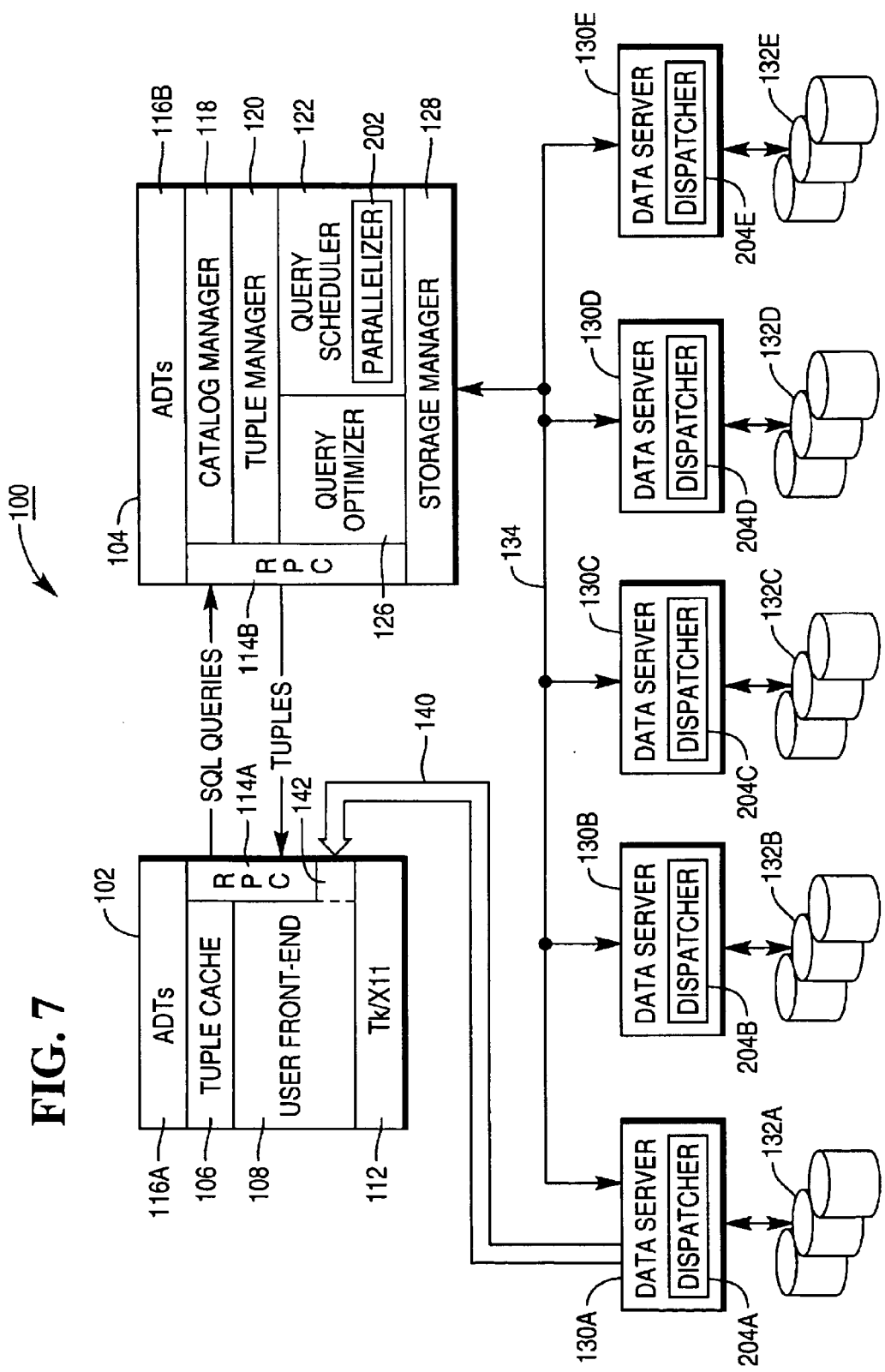
FIG. 7 is a block diagram showing an exemplary environment for practicing one or more embodiments of the present invention.

Parallelizer 202 heavily relies on catalogs. Consequently, the parallelizer 202's functionality cannot be moved outside of QC 104 (e.g., to data servers 130). However, dispatcher 204 does not need the catalogs. Thus, in accordance with one or more embodiments of the invention, dispatcher 204 is moved to data server 130. FIG. 7 illustrates the data system 100 as illustrated in FIG. 1 with dispatchers 204A–204E located on data servers 130A–130E. FIG. 7 also illustrates that parallelizer 202 still remains in query scheduler 122 of QC 104. To move dispatcher 204 to data server 130, one or more embodiments of the invention provide/permit a trigger to utilize a dispatcher class for the execution of trigger actions. Thus, an instance of a dispatcher class (that may be programmed in any programming language including object oriented programming languages such as C++) may be instantiated at each data server 130.

To separate the non-system catalog operations from the system-catalog operations (i.e., the move of dispatchers 204 to data servers 130), one or more embodiments of the invention implement a two phase plan. In the first phase, a trigger action is "prepared" for execution. Phase one is executed at QC 104. The "preparation" of the trigger action (or a query of a trigger action) includes all actions performed by QC 104 as described above except for actions performed by dispatcher 204. Thus, phase one includes query optimization and the generation of an ASCII plan by query optimizer 126. Additionally, phase one includes the parallelization of the query of the trigger action by parallelizer 202 (i.e., all of the steps of FIG. 3) resulting in the generation of the exec_plan_t as described above.

After phase one is complete, no more catalog look-ups are needed for execution of the trigger action. However, some steps described above that are performed by dispatcher 204 (e.g., steps 400 and 402) do not utilize the system catalogs. Accordingly, QC 104 may perform either or both steps 400 and 402 of FIG. 4. Thus, in accordance with one or more embodiments of the invention, the exec_plan_t can be flattened and packed in a valise. Thereafter, the exec_plan_t can either be stored in the catalogs or shipped to data servers 130. In one or more embodiments of the invention, the plan can be shipped to a data server 130 as a part of a predicate (of an SQL query). Further, prior to shipping the plan to data server 130, the endpoints may be set up by QC 104.

As illustrated in FIG. 7, each data server 130A–130E can have an instance of a dispatcher object 204A–204E. Each instance has the capability to receive a flattened execution plan (e.g., from QC 104) and execute the plan. In one or more embodiments of the invention, data server 130 and QC 104 are running the same executable code (i.e., data server 130 and QC 104 are each performing operations needed to execute the same trigger action). Consequently, all of the dispatcher 204 code is available to data server 130.

Figure 8:
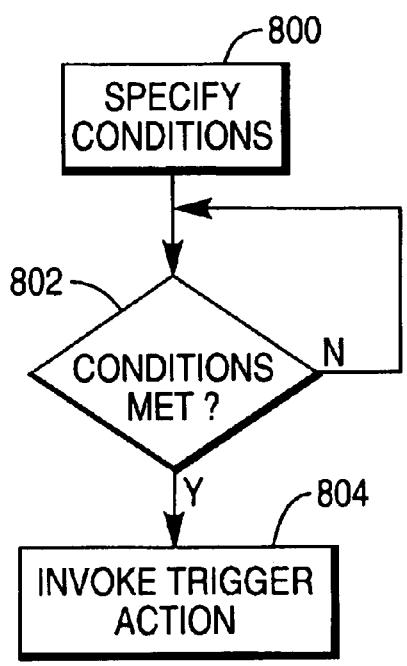
FIG. 8 is a flow chart illustrating the firing of a trigger in accordance with one or more embodiments of the invention.

FIG. 8 is a flow chart illustrating the firing of a trigger (also referred to as the invocation of a trigger action) in accordance with one or more embodiments of the invention. At step 800, the conditions of the trigger are specified. At step 802, a determination is made regarding whether the specified conditions have been met. In other words, when a tuple has been updated, the specified conditions are checked. Step 802 determines if the specified conditions that were checked have been met. The process continues until the conditions have been met. Once the conditions have been met, the trigger action is invoked at step 804.

Figure 9:
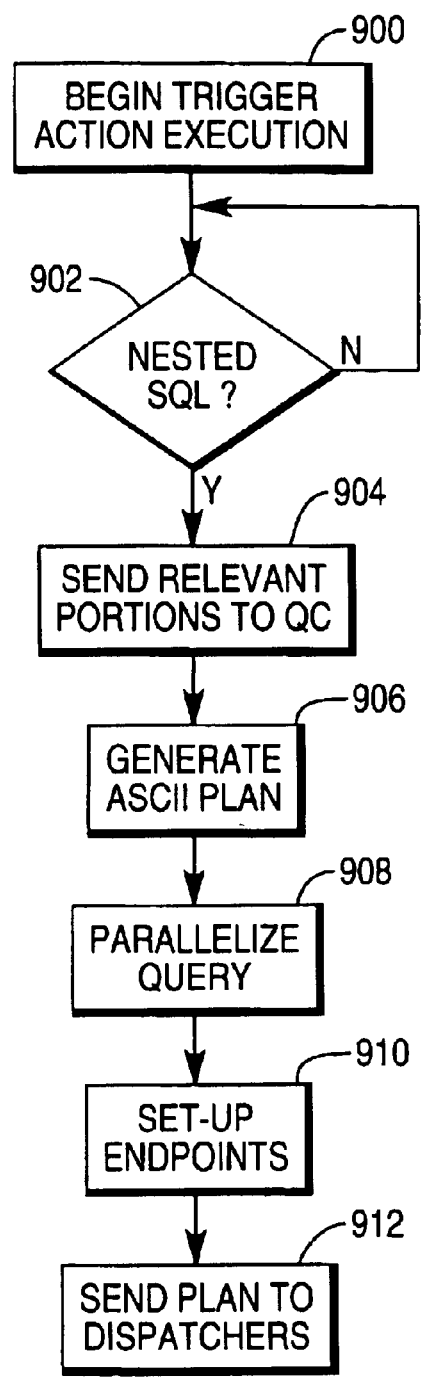
FIG. 9 is a flow chart illustrating the operation of various nodes in accordance with one or more embodiments of the invention.

As described above, the trigger action/query is executed on the various data servers 130A–130E. FIG. 9 is a flow chart illustrating the operation of various nodes in accordance with one or more embodiments of the invention. At step 900, execution of the trigger action begins. At step 902, a determination is made as to whether an SQL statement (or any portion of the trigger action that requires catalog access) is encountered in the trigger action. If not, execution of the trigger action continues. If an SQL query or catalog access operation is encountered, the relevant portions of the trigger action (e.g., the portions that require catalog access) are forwarded to QC 104 at step 904. At step 906, QC 104 generates the ASCII plan (e.g., using query optimizer 126). At step 908, parallelizer 202 parallelizes the plan and generates an exec_plan_t. At step 910, the various endpoints are set up. At step 912, the exec_plan_t is sent to the appropriate dispatcher 204A–204E for execution. Thus, during execution of the trigger action, the flattened plan (e.g., the exec_plan_t) can be sent to the dispatcher 204 for execution.

By implementing the invention as described above, when a trigger condition has been met (e.g., the upon the firing of a trigger), a flattened execution plan can be sent to the dispatcher 204 for parallel execution. The dispatcher instances 204 takes care of all of the execution and just reports the results to the caller (i.e., the trigger). In accordance with the above described embodiments, the triggers can be fired from anywhere in system 100, the trigger action itself is executed in parallel using a shared nothing architecture, and the trigger action itself can have triggers associated with it, giving rise to arbitrarily nested triggers (that are also processed in parallel).

Hardware and Software Embodiments

Referring back to FIGS. 1 and 7, an exemplary hardware and software environment is shown that could be used to implement one or more embodiments of the invention. Each node (i.e., client program 102, QC 104, data server 130, and data storage device 132) may each comprise a computer that may have a processor and a memory, such as random access memory (RAM). Additionally, each node may be operatively coupled to a display, which presents images such as windows to the user on a graphical user interface (e.g., user front-end 108). Each node may be coupled to other devices, such as a keyboard, a mouse device, a printer, etc. Of course, those skilled in the art will recognize that any combination of the above components, or any number of different components, peripherals, and other devices, may be used with embodiments of the invention.

Generally, each node may operate under the control of an operating system stored in memory. In one or more embodiments, the client program 102 (and the other nodes) interfaces with the user to accept inputs and commands and to present results through a graphical user interface (GUI) (e.g., user front-end 108). The instructions performing the GUI functions can be resident or distributed in the operating system, a computer program, or implemented with special purpose memory and processors. Embodiments of the invention may also implement a compiler that allows an application program written in a programming language such as Java, COBOL, C++, FORTRAN, or other language to be translated into processor readable code. After completion, the application may access and manipulate data stored in memory using the relationships and logic that was generated using the compiler. Embodiments of the invention also optionally comprise an external communication device such as a modem, satellite link, Ethernet card, or other device for communicating with other computers.

In one embodiment, instructions implementing the operating system, the computer program, the compiler, and database records, tables and information are tangibly embodied in a computer-readable medium, e.g., data storage devices 132, which could include one or more fixed or removable data storage devices, such as a zip drive, floppy disc drive, hard drive, CD-ROM drive, tape drive, etc. Further, such information may be partitioned across multiple data storage devices 132 as described above. The operating system and the computer program may be comprised of instructions which, when read and executed by a computer, cause the computer to perform the steps necessary to implement and/or use the present invention. Computer programs and/or operating instructions may also be tangibly embodied in memory and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of one or more embodiments of the invention. In summary, the invention describes a method, apparatus, and article of manufacture for parallel execution of trigger actions.

The method comprises providing a class called dispatcher that can take a trigger action and start parallel execution of the trigger action. The trigger action is parallelized. The dispatcher executes the trigger action, sets up the communication links between the various operators in the trigger action, and ensures that all of the results are sent back to the data server that originated the trigger action request.

Other embodiments of the invention include a program storage device tangibly embodying instructions for performing the method steps above on a computer or similar device, and an apparatus for performing the foregoing operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of parallel execution of a trigger action comprising:
   obtaining a trigger action that has been invoked from anywhere in a parallel database system;
   transmitting at least a portion of the trigger action to a query coordinator;
   the query coordinator executing a portion of the trigger action that requires access to catalog information wherein such executing comprises generating an execution plan that provides for parallel execution of at least a portion of the trigger action;
   transmitting at least a portion of the execution plan from the query coordinator to a plurality of dispatcher instances on a plurality of data servers; and
   the plurality of dispatchers executing the transmitted portions of the execution plan on the plurality of data servers.

2. The method of claim 1 wherein the generating an execution plan further comprises:
   a query optimizer generating an ASCII plan; and
   a parallelizer generating a parallel execution plan.

3. The method of claim 1 wherein the trigger action comprises an SQL query.

4. The method of claim 1 wherein the obtaining a trigger action comprises invoking a trigger action when specified conditions are fulfilled.

5. The method of claim 1 wherein execution of the trigger action causes the invocation of a second trigger action.

6. The method of claim 1 wherein the dispatcher instances are configured to execute a flattened execution plan.

7. The method of claim 1 wherein the dispatcher instances are configured to:
   pack operation information and arguments of the execution plan into a valise; and set up one or more endpoints so that an operation knows where to send its results.

8. A system for parallel execution of a trigger action comprising:
   a trigger action that has been invoked from anywhere in a parallel database system;
   a plurality of one or more data servers;
   a dispatcher on each of the plurality of data servers, wherein each dispatcher is configured to:
   receive at least a portion of an execution plan; and
   execute the received portion of the execution plan on its data server; a query coordinator configured to:
   receive at least a portion of the trigger action;
   execute a portion of the trigger action that requires access to catalog information wherein such executing comprises generating the execution plan that provides for parallel execution of the portion of the trigger action; and
   transmit at least a portion of the execution plan to a plurality of dispatchers on the plurality of data servers.

9. The system of claim 8 further comprising:
   a query optimizer in the query coordinator, the query optimizer configured to generate an ASCII plan from the portion of the trigger action; and
   a parallelizer in the query coordinator, the parallelizer configured to generate a parallel execution plan from said ASCII plan.

10. The system of claim 8 wherein the trigger action comprises an SQL query.

11. The system of claim 8 further comprising a trigger configured to invoke the trigger action when specified conditions are fulfilled.

12. The system of claim 8 wherein execution of the trigger action causes the invocation of a second trigger action.

13. The system of claim 8 wherein the dispatcher is configured to execute a flattened execution plan.

14. The system of claim 8 wherein the dispatcher is further configured to:
   pack operation information and arguments of the execution plan into a valise; and set up one or more endpoints so that an operation knows where to send its results.

15. An article of manufacture for parallel execution of a trigger action comprising:
   means for obtaining a trigger action that has been invoked from any where in a parallel database system;
   means for transmitting at least a portion of the trigger action to a query coordinator;
   means for the query coordinator to execute a portion of the trigger action that requires access to catalog information wherein such executing comprises means for generating an execution plan that provides for parallel execution of the portion of the trigger action;
   means for transmitting at least a portion of the execution plan from the query coordinator to a plurality of dispatcher instances on a plurality of data servers; and
   means for the plurality of dispatchers to execute the transmitted portions of the execution plan on the plurality of data servers.

16. The article of manufacture of claim 15 wherein the means for generating an execution plan further comprises:

means for a query optimizer to generate an ASCII plan; and means for a parallelizer to generate a parallel execution plan.

17. The article of manufacture of claim 15 wherein the trigger action comprises an SQL query.

18. The article of manufacture of claim 15 wherein the means for obtaining a trigger action comprises means for invoking a trigger action when specified conditions are fulfilled.

19. The article of manufacture of claim 15 wherein the execution of the trigger action causes the invocation of a second trigger action.

20. The article of manufacture of claim 15 wherein the dispatcher instances are configured to execute a flattened execution plan.

21. The article of manufacture of claim 15 wherein the dispatcher instances are configured to:

pack operation information and arguments of the execution plan into a valise; and set up one or more endpoints so that an operation knows where to send its results.

* * * * *

UNITED STATES PATENT AND TRADEMARK OFFICE
CERTIFICATE OF CORRECTION

PATENT NO.   : 6,732,084 B1
DATED        : May 4, 2004
INVENTOR(S)  : Kabra, N. et al It is certified that error appears in the above-identified patent and that said Letters Patent is hereby corrected as shown below:

Column 18,
Line 51, after "any" delete "where" and insert -- wherein in --

Signed and Sealed this

Twenty-second Day of February, 2005

JON W. DUDAS
*Director of the United States Patent and Trademark Office*